(12) United States Patent
Oko

(10) Patent No.: US 12,499,523 B2
(45) Date of Patent: Dec. 16, 2025

(54) IMAGE PROCESSING APPARATUS AND IMAGE PROCESSING METHOD

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 411 days.

(21) Appl. No.: 18/111,255

(22) Filed: Feb. 17, 2023

(65) Prior Publication Data
US 2023/0281765 A1 Sep. 7, 2023

(30) Foreign Application Priority Data
Mar. 4, 2022 (JP) ................. 2022-033168

(51) Int. Cl.
*G06T 5/80* (2024.01)
*G06T 5/50* (2006.01)
*G06T 7/593* (2017.01)
*G06T 7/80* (2017.01)

(52) U.S. Cl.
CPC ............... *G06T 5/80* (2024.01); *G06T 5/50* (2013.01); *G06T 7/593* (2017.01); *G06T 7/85* (2017.01); *G06T 2207/10012* (2013.01); *G06T 2207/30252* (2013.01)

(58) Field of Classification Search
CPC .. G06T 5/80; G06T 5/50; G06T 7/593; G06T 7/85; G06T 2207/10012; G06T 2207/30252; G06T 2207/10021
See application file for complete search history.

(56) References Cited

U.S. PATENT DOCUMENTS

| | | | |
|---|---|---|---|
| 2013/0250065 A1* | 9/2013 | Aoki | H04N 13/128 348/46 |
| 2017/0201736 A1* | 7/2017 | Ishimaru | H04N 13/246 |
| 2020/0271447 A1* | 8/2020 | Aoki | G01B 11/00 |

FOREIGN PATENT DOCUMENTS

| | | |
|---|---|---|
| JP | 2020-165968 A | 10/2020 |
| JP | 2020204583 A | * 12/2020 |

* cited by examiner

*Primary Examiner* — Matthew C Bella
*Assistant Examiner* — Andrew B. Jones
(74) *Attorney, Agent, or Firm* — TROUTMAN PEPPER LOCKE LLP

(57) ABSTRACT

An image processing apparatus includes a first distance calculation unit, a second distance calculation unit, a correction amount calculation unit, and an image correction unit. The first distance calculation unit calculates a first distance to an imaging target based on first images which are generated by a first camera and included in stereo images. The second distance calculation unit calculates a second distance to the imaging target based on at least one of the stereo images. The correction amount calculation unit calculates, if a difference between pixel positions, each corresponding to the imaging target, in the respective first images is within a predetermined amount, a correction amount of a pixel position corresponding to the imaging target in an image based on the first and second distances. The image correction unit causes a position of a pixel value included in the image to move laterally based on the correction amount.

9 Claims, 12 Drawing Sheets

IMAGE PROCESSING APPARATUS AND IMAGE PROCESSING METHOD

CROSS-REFERENCE TO RELATED APPLICATION

The present application claims priority from Japanese Patent Application No. 2022-033168 filed on Mar. 4, 2022, the entire contents of which are hereby incorporated by reference.

BACKGROUND

The disclosure relates to an image processing apparatus that obtains a parallax image on the basis of a stereo image, and an image processing method to be used in such an image processing apparatus.

A vehicle such as an automobile detects a distance and an orientation to a surrounding object by performing a stereo matching process on the basis of a stereo image obtained by a stereo camera. In this technique, the distance to the object is detected on the basis of a parallax based on a left image and a right image. For example, Japanese Unexamined Patent Application Publication No. 2020-165968 discloses a technique of calibrating a parallax with use of an image captured in the absence of a windshield and an image captured in the presence of the windshield.

SUMMARY

An aspect of the disclosure provides an image processing apparatus. The image processing apparatus includes a first distance calculation unit, a second distance calculation unit, a correction amount calculation unit, and an image correction unit. The first distance calculation unit is configured to calculate a first distance on the basis of first images generated by a first camera. The first distance is a distance to an imaging target. The first images are included in stereo images that are generated by a stereo camera sequentially performing image capturing operations. The stereo camera includes the first camera and a second camera. The second distance calculation unit is configured to calculate a second distance on the basis of at least one of the stereo images. The second distance is a distance to the imaging target. The correction amount calculation unit is configured to determine whether a difference between pixel positions, each corresponding to the imaging target, in the respective first images is within a predetermined amount, and, in a case where the difference between the pixel positions is within the predetermined amount, calculate, on the basis of the first distance and the second distance, a correction amount of a pixel position corresponding to the imaging target in an image generated by the second camera. The image correction unit is configured to cause a position of a pixel value included in the image generated by the second camera to move in a lateral direction on the basis of the correction amount.

An aspect of the disclosure provides an image processing method. The image processing method includes: calculating a first distance on the basis of first images generated by a first camera, the first distance being a distance to an imaging target, the first images being included in stereo images that are generated by a stereo camera sequentially performing image capturing operations, the stereo camera including the first camera and a second camera; calculating a second distance on the basis of at least one of the stereo images, the second distance being a distance to the imaging target; determining whether a difference between pixel positions, each corresponding to the imaging target, in the respective first images is within a predetermined amount, and, in a case where the difference between the pixel positions is within the predetermined amount, calculating, on the basis of the first distance and the second distance, a correction amount of a pixel position corresponding to the imaging target in an image generated by the second camera; and causing a position of a pixel value included in the image generated by the second camera to move in a lateral direction on the basis of the correction amount.

An aspect of the disclosure provides an image processing apparatus. The image processing apparatus includes circuitry. The circuitry is configured to: calculate a first distance on the basis of first images generated by a first camera, the first distance being a distance to an imaging target, the first images being included in stereo images that are generated by a stereo camera sequentially performing image capturing operations, the stereo camera including the first camera and a second camera; calculate a second distance on the basis of at least one of the stereo images, the second distance being a distance to the imaging target; determine whether a difference between pixel positions, each corresponding to the imaging target, in the respective first images is within a predetermined amount, and, in a case where the difference between the pixel positions is within the predetermined amount, calculate, on the basis of the first distance and the second distance, a correction amount of a pixel position corresponding to the imaging target in an image generated by the second camera; and cause a position of a pixel value included in the image generated by the second camera to move in a lateral direction on the basis of the correction amount.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
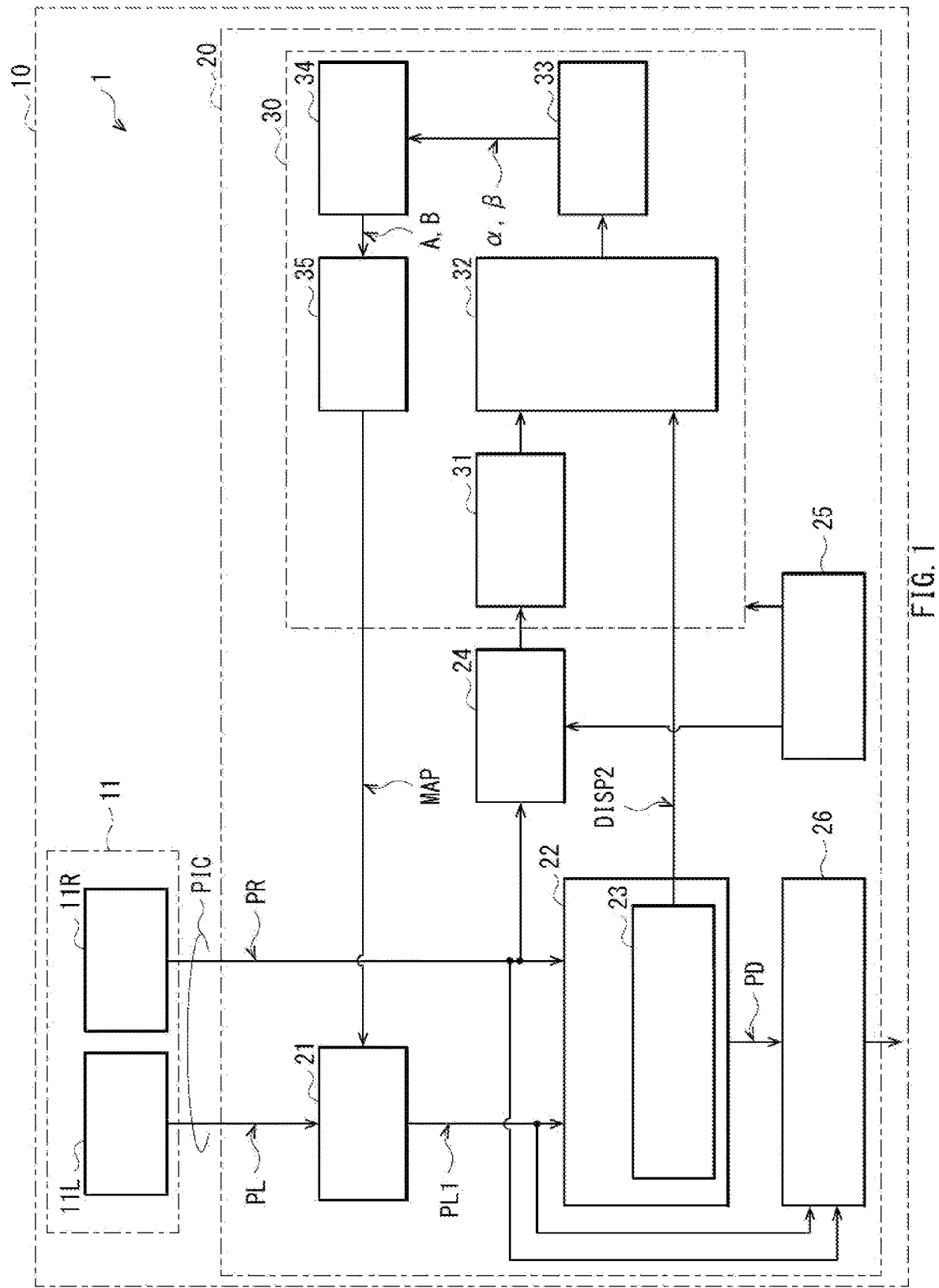
FIG. 1 is a block diagram illustrating a configuration example of an image processing apparatus according to one example embodiment of the disclosure.

An image processing apparatus generates a parallax image by performing a stereo matching process. It is desirable that that accuracy of such a parallax image be high, and a further improvement in the accuracy is expected.

It is desirable to provide an image processing apparatus that is able to enhance accuracy of a parallax image.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates a configuration example of an image processing apparatus 1 according to an example embodiment. In one embodiment, the image processing apparatus 1 may serve as an "image processing apparatus". The image processing apparatus 1 may include a stereo camera 11 and a processor 20. The image processing apparatus 1 may be mounted on a vehicle 10 such as an automobile in this example. In one embodiment, the vehicle 10 may serve as a "mobile object".

The stereo camera 11 may capture an image ahead of the vehicle 10 to thereby generate a pair of images (a left image PL and a right image PR) each having a parallax with respect to each other. The stereo camera 11 may have a left camera 11L and a right camera 11R. The left camera 11L and the right camera 11R may each include a lens and an image sensor.

Figure 2:
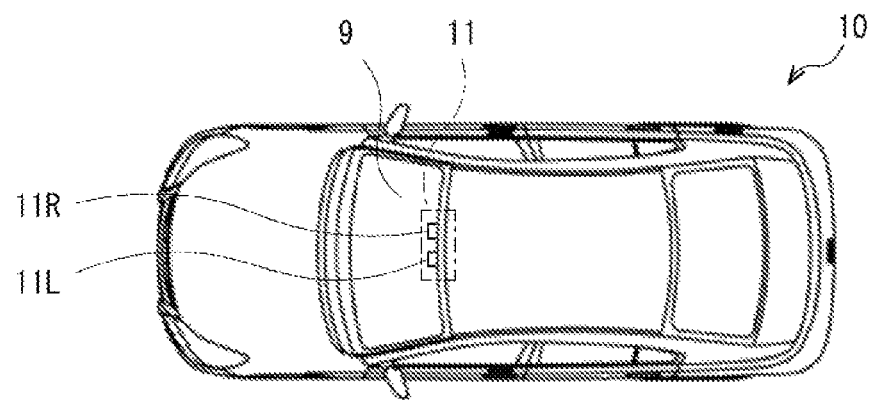
FIG. 2 is an explanatory diagram illustrating an exemplary placement of a stereo camera illustrated in FIG. 1.

FIG. 2 illustrates an exemplary placement of the stereo camera 11 in the vehicle 10. In this example, the left camera 11L and a right camera 11R may be disposed in the vicinity of an upper part of the windshield 9 of the vehicle 10 inside the vehicle 10, and separated away from each other by a predetermined distance in a width direction of the vehicle 10. The left camera 11L may generate the left image PL, and the right camera 11R may generate the right image PR. The left image PL and the right image PR may form a stereo image PIC. The stereo camera 11 may perform an imaging operation at a predetermined frame rate (for example, 60 [fps]) to thereby generate a series of stereo images PIC, and supply the processor 20 with the generated series of stereo images PIC.

The processor 20 (illustrated in FIG. 1) may recognize an object ahead of the vehicle 10 on the basis of the stereo image PIC supplied by the stereo camera 11. The vehicle 10 may perform, for example, traveling control of the vehicle 10 on the basis of information related to an object recognized by the processor 20. Alternatively, the vehicle 10 may display the information related to the object on a console monitor. The processor 20 may include, for example, a central processing unit (CPU) that executes programs, a random access memory (RAM) that temporarily stores processing data, and a read only memory (ROM) that stores programs. The processor 20 may include an image correction unit 21, a parallax image generation unit 22, a simultaneous localization and mapping (SLAM) processing unit 24, a correction amount calculation unit 30, a control unit 25, and an object recognition unit 26.

The image correction unit 21 may be configured to perform an image correction process on the left image PL using correction map data MAP to thereby generate a left image PL1. The image correction unit 21 may perform the image correction process corresponding to image distortion that is caused by the windshield 9. In other words, a glass portion of the windshield 9 in front of an imaging plane of the left camera 11L and a glass portion of the windshield 9 in front of an imaging plane of the right camera 11R may each desirably have a uniform optical characteristic, but can each have a non-uniform optical characteristic in practice. In this case, for example, the left image PL and the right image PR can each be distorted. For example, in a case where the left image PL is different from the right image PR in image distortion in a lateral direction, the difference in image distortion may influence a parallax obtained by a stereo matching process, and this may decrease accuracy of a parallax image PD. Accordingly, the image processing apparatus 1 may move a position of a pixel value of the left image PL in the lateral direction by an amount of the difference in image distortion, in such a manner that the influence caused by the difference in image distortion on the parallax image PD is reduced.

The correction map data MAP may be map data of correction amount to be used in correcting the image distortion in the lateral direction. The image correction unit 21 may generate the left image PL1 by, for example, moving a position of a pixel value in the left image PL in the lateral direction by a correction amount corresponding to the position of the pixel value in the correction map data MAP.

The parallax image generation unit 22 may be configured to perform a predetermined image process including the stereo matching process on the basis of the left image PL1 and the right image PR to thereby generate the parallax image PD. The parallax image PD may have pixel values. The pixel values may each indicate a value related to a parallax in a relevant pixel. In other words, the pixel values may each be a distance to a point corresponding to the relevant pixel in a three-dimensional real space.

The parallax image generation unit 22 may include a corresponding-point detection part 23. The corresponding-point detection part 23 may be configured to perform the stereo matching process on the basis of the left image PL1 and the right image PR to thereby perform a detection of a corresponding point. The corresponding point may include an image point in the left image PL1 and an image point in the right image PR which correspond to each other. The corresponding-point detection part 23 may detect the corresponding point by, for example, template matching, or may detect the corresponding point by feature amount matching based on a local feature amount. The corresponding-point detection part 23 may calculate, as a parallax DISP2 of the corresponding point, a difference between a position in the lateral direction of the image point in the left image PL1 and a position in the lateral direction of the image point in the right image PR. The parallax DISP2 may be expressed in units of pixels, for example. The corresponding-point detection part 23 may supply the correction amount calculation unit 30 with the respective parallaxes DISP2 of the detected corresponding points together with data (pixel position data) related to pixel positions of the corresponding points. The parallax image generation unit 22 may generate the parallax image PD on the basis of a result of the detection performed by the corresponding-point detection part 23.

The SLAM processing unit 24 may be configured to perform a SLAM process on the basis of right images PR whose imaging timings differ from each other, to thereby calculate a distance to an object that remains still which is included in each of the right images PR. The right images PR may be, for example, two consecutive right images PR or three consecutive right images PR. The SLAM processing unit 24 may supply the correction amount calculation unit 30 with data (distance data) related to the distance and data (pixel position data) related to a pixel position of the object in each of the right images PR.

The correction amount calculation unit 30 may be configured to generate the correction map data MAP on the basis of the distance data and the pixel position data supplied by the SLAM processing unit 24, and the parallax DISP2 and the pixel position data supplied by the corresponding-point detection part 23.

Figure 3:
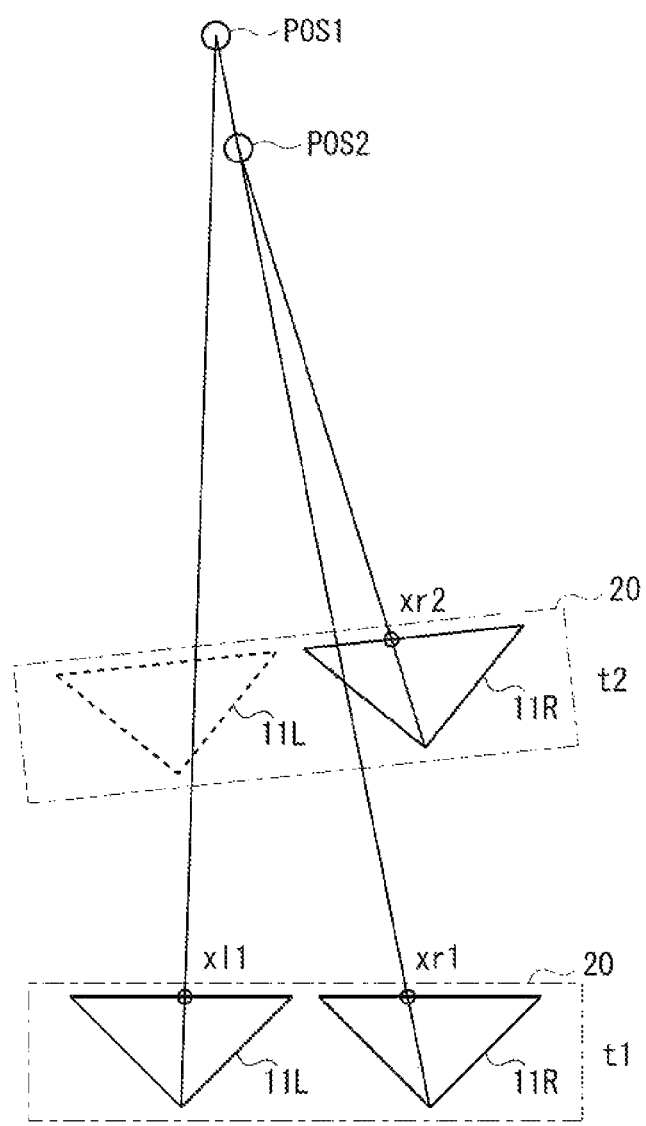
FIG. 3 is an explanatory diagram illustrating an operating principle of a correction amount calculation unit illustrated in FIG. 1.

FIG. 3 illustrates an operating principle of an operation of generating a correction amount in the correction map data MAP to be performed by the correction amount calculation unit 30. In this case, the SLAM process is performed using two consecutive right images PR.

In this case, the left camera 11L and the right camera 11R may each image at timing t1 an object that remains still. Thereafter, the stereo matching process may be performed on the basis of the left image PL generated by the left camera 11L and the right image PR generated by the right camera 11R, and a distance to the object may be calculated. In the left image PL, a position in the lateral direction of the object may be xl1. In the right image PR, a position in the lateral direction of the object may be xr1. Accordingly, on the basis of the positions xl1 and xr1, a position POS1 of the object in the three-dimensional space may be calculated. In a case where the glass portion of the windshield 9 in front of the imaging plane of the left camera 11L and the glass portion of the windshield 9 in front of the imaging plane of the right camera 11R each have a non-uniform optical characteristic, the left image PL and the right image PR may each be distorted. Accordingly, the thus obtained position POS1 of the object can be different from the actual position of the object. The distance from the stereo camera 11 to the position POS1 can thus be also different from the actual distance.

Thereafter, for example, the right camera 11R may image the object at timing t2 which is an imaging timing subsequent to timing t1. In this example, the SLAM process may be performed on the basis of the two right images PR generated at respective timings t1 and t2, and the distance to the object may be calculated. In the right image PR at timing t1, the position in the lateral direction of the object may be xr1. In the right image PR at timing t2, the position in the lateral direction of the object may be xr2. On the basis of the positions xr1 and xr2, a position POS2 of the object in the three-dimensional space may be calculated. In a case where the glass portion in front of the imaging plane of the right camera 11R has a non-uniform optical characteristic, the right image PR may be distorted. Accordingly, the thus obtained position POS2 of the object can be different from the actual position of the object.

In this example, the position xr1 at timing t1 and the position xr2 at timing t2 may be substantially the same. In this case, distortion of the image of the object in the right image PR obtained at timing t1 and distortion of the image of the object in the right image PR obtained at timing t2 may be substantially the same. Thus, the distance from the stereo camera 11 to the position POS2 may be uninfluenced by the image distortion that is caused by the windshield 9, and may be substantially the same as the actual distance.

In such a case where the position xr1 at timing t1 and the position xr2 at timing t2 are substantially the same, the distance obtained by the SLAM process may be substantially the same as the actual distance. The correction amount calculation unit 30 may perform calibration using the distance obtained by the SLAM process in such a case. In one example, the correction amount calculation unit 30 may adjust an amount by which the left image PL is to be moved in the lateral direction in such a manner that the distance obtained by the stereo matching process becomes the same as the distance obtained by the SLAM process. In this manner, the correction amount calculation unit 30 may calculate the correction amount in the correction map data MAP.

The correction amount calculation unit 30 illustrated in FIG. 1 may include a determination part 31, a parallax value storage 32, a parameter calculation part 33, a correction coefficient calculation part 34, and a correction map storage 35.

The determination part 31 may be configured to determine, on the basis of the distance data and the pixel position data supplied by the SLAM processing unit 24, whether to use the distance data for the calculation of the correction amount. In one example, the determination part 31 may determine whether pixel positions of an object in respective right images PR are close to each other on the basis of the pixel position data supplied by the SLAM processing unit 24. For example, in the example of FIG. 3, the pixel position data may include the position xr1 at timing t1 and the position xr2 at timing t2. The determination part 31 may determine whether a difference between the position xr1 at timing t1 and the position xr2 at timing t2 is within a predetermined amount. If the difference between the position xr1 at timing t1 and the position xr2 at timing t2 is within the predetermined amount, the determination part 31 may determine that the distance data supplied by the SLAM processing unit 24 is to be used for the calculation of the correction amount, and may supply the parallax value storage 32 with the distance data and the pixel position data supplied by the SLAM processing unit 24.

Figure 4:
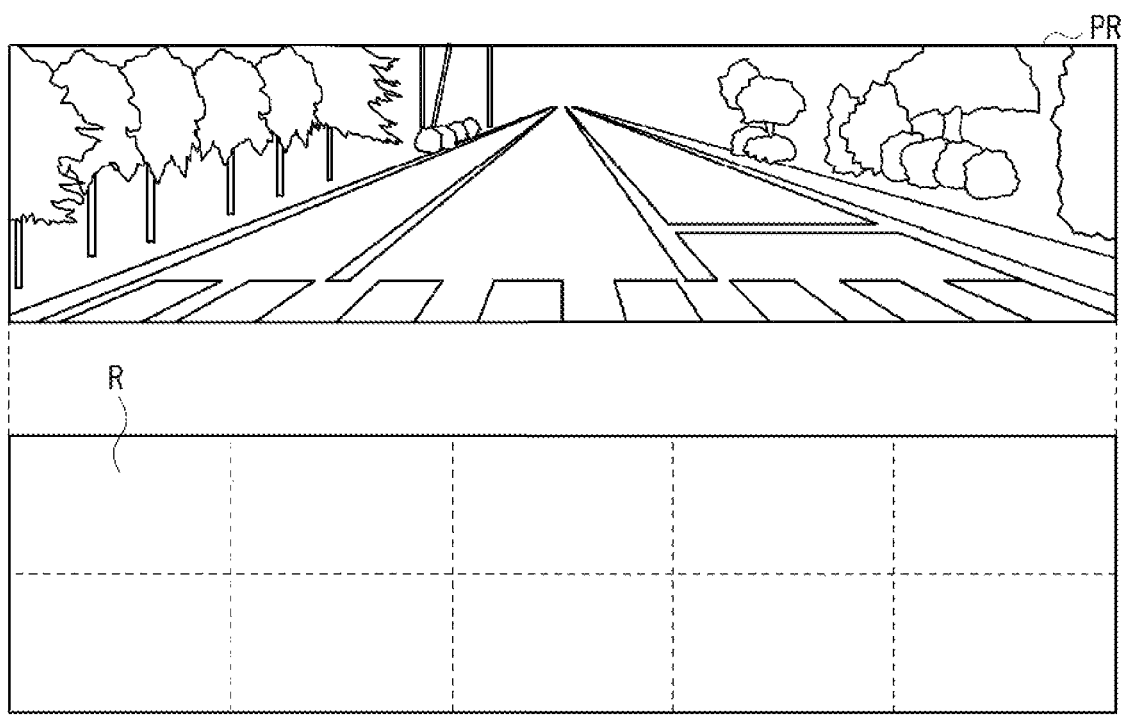
FIG. 4 is an explanatory diagram illustrating an example of an image region R.

The parallax value storage 32 may be configured to convert, on the basis of the distance data and the pixel position data supplied by the determination part 31, the distance to the object indicated by the distance data into a parallax DISP1, and to store the parallax DISP1 in association with the pixel position indicated by the pixel position data. The parallax DISP1 may be expressed in units of pixels, for example. Further, the parallax value storage 32 may be configured to store the parallax DISP2 related to the object supplied by the corresponding-point detection part 23 in association with the pixel position of the corresponding point. In this example, as illustrated in FIG. 4, the entire image region of the right image PR may be divided into multiple (10 in this example) image regions R. The parallax value storage 32 may store the parallax DISP1 in association with the image region R to which the pixel position indicated by the pixel position data belongs, and may store the parallax DISP2 in association with the image region R to which the pixel position of the corresponding point belongs. Although the number of image regions R is 10 in this example, the number thereof is not limited thereto, and may be more than 10.

The parameter calculation part 33 may be configured to calculate, for each of the image regions R, a parameter α and a parameter β indicating a relationship between the parallax DISP1 and the parallax DISP2. In one example, the parameter calculation part 33 may calculate, for each of the image regions R, the parameters α and β in such a manner that a value err becomes the minimum by using the following equation.

$$err = \Sigma(DISP1 - DISP2 \times \alpha + \beta)$$

Where α represents a parallax gain, and β represents a parallax deviation. In a case where the image correction unit 21 performs an appropriate image correction, the parameter α is expected to be "1" and the parameter β is expected to be "0".

The correction coefficient calculation part 34 may be configured to calculate, for each of the image regions R, a correction coefficient A and a correction coefficient B on the basis of the parameters α and β. For example, the correction coefficient calculation part 34 may increase the correction coefficient A if the parameter α is greater than 1, and may decrease the correction coefficient A if the parameter α is less than 1. Further, the correction coefficient calculation part 34 may increase the correction coefficient B if the parameter β is greater than 0, and may decrease the correction coefficient B if the parameter β is less than 0. In an ideal case where no image distortion due to the windshield 9 occurs, the correction coefficient A may be expected to be "1" and the correction coefficient B may be expected to be "0".

The correction map storage 35 may be configured to update, in each of the image regions R, a correction amount in a relevant image region R in the correction map data MAP on the basis of the correction coefficients A and B. The correction map storage 35 may, for example, set the correction coefficient B in each of the image regions R as the correction amount in the relevant image region R. The correction map storage 35 may, for example, further use the correction coefficient A to calculate the correction amount in the relevant image region R.

The control unit 25 may be configured to control an operation to be performed by the SLAM processing unit 24 and the correction amount calculation unit 30.

The object recognition unit 26 may be configured to perform a recognition of an object ahead of the vehicle 10 on the basis of the left image PL1, the right image PR, and the parallax image PD that is generated by the parallax image generation unit 22. The object recognition unit 26 may output data related to a result of the recognition.

In one embodiment, the stereo camera 11 may serve as a "stereo camera". In one embodiment, the right camera 11R may serve as a "first camera". In one embodiment, the left camera 11L may serve as a "second camera". In one embodiment, the SLAM processing unit 24 may serve as a "first distance calculation unit". In one embodiment, the parallax DISP1 may serve as a "first distance". In one embodiment, the corresponding-point detection part 23 may serve as a "second distance calculation unit". In one embodiment, the parallax DISP2 may serve as a "second distance". In one embodiment, the correction amount calculation unit 30 may serve as a "correction amount calculation unit". In one embodiment, the image correction unit 21 may serve as an "image correction unit". In one embodiment, the control unit 25 may serve as a "control unit".

Now, description will be given on operations and workings of the image processing apparatus 1 according to the example embodiment.

First, with reference to FIG. 1, an outline of overall operations of the image processing apparatus 1 will be described. The stereo camera 11 may capture an image ahead of the vehicle 10 to thereby generate the stereo image PIC including the left image PL and the right image PR. In the processor 20, the image correction unit 21 may perform the image correction process on the left image PL using the correction map data MAP to thereby generate the left image PL1. The parallax image generation unit 22 may perform a predetermined image process including the stereo matching process on the basis of the left image PL1 and the right image PR to thereby generate the parallax image PD. The corresponding-point detection part 23 included in the parallax image generation unit 22 may detect a corresponding point that includes an image point in the left image PL1 and an image point in the right image PR, and may calculate, as the parallax DISP2 of the corresponding point, a difference between a position in the lateral direction of the image point in the left image PL1 and a position in the lateral direction of the image point in the right image PR. The corresponding-point detection part 23 may supply the correction amount calculation unit 30 with the respective parallaxes DISP2 of the detected corresponding points together with data (pixel position data) related to pixel positions of the corresponding points. The SLAM processing unit 24 may perform the SLAM process on the basis of right images PR whose imaging timings differ from each other, to thereby calculate a distance to an object that remains still which is included in each of the right images PR. The SLAM processing unit 24 may supply the correction amount calculation unit 30 with data (distance data) related to the distance and data (pixel position data) related to a pixel position of the object in each of the right images PR. The correction amount calculation unit 30 may generate the correction map data MAP on the basis of the distance data and the pixel position data supplied by the SLAM processing unit 24, and the parallax DISP2 and the pixel position data supplied by the corresponding-point detection part 23. The control unit 25 may control the operation to be performed by the SLAM processing unit 24 and the correction amount calculation unit 30. The object recognition unit 26 may recognize an object ahead of the vehicle 10 on the basis of the left image PL1, the right image PR, and the parallax image PD that is generated by the parallax image generation unit 22.

Figure 5:
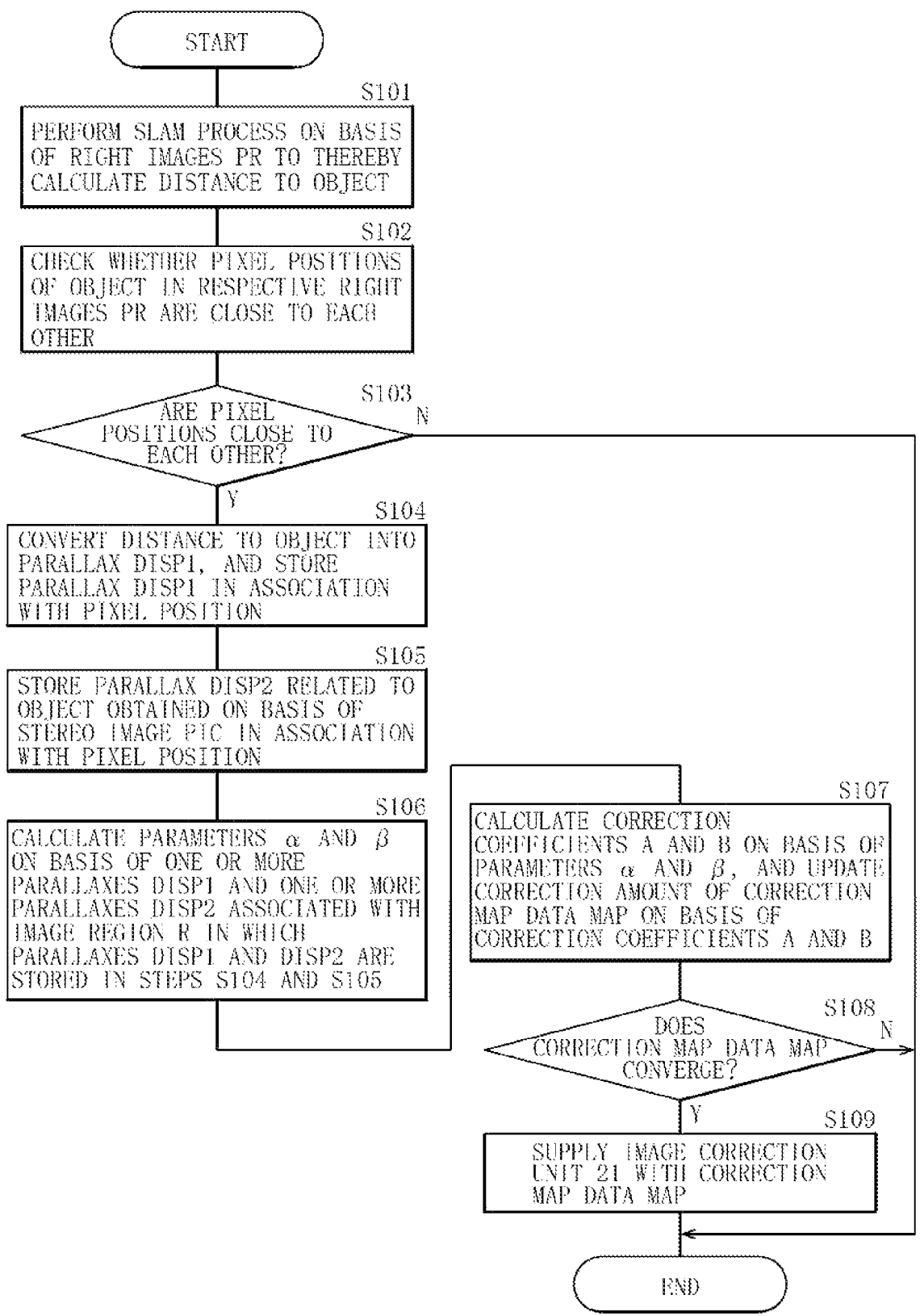
FIG. 5 is a flowchart illustrating an operation example of a processor illustrated in FIG. 1.

FIG. 5 illustrates an operation example to be performed by the SLAM processing unit 24 and the correction amount calculation unit 30. The SLAM processing unit 24 and the correction amount calculation unit 30 may perform the following processes every time the stereo camera 11 supplies the processor 20 with the stereo image PIC.

First, the SLAM processing unit 24 may perform the SLAM process on the basis of the right images PR whose imaging timings differ from each other, to thereby calculate the distance to the object that remains still which is included in each of the right images PR (step S101). Thereafter, the SLAM processing unit 24 may supply the correction amount calculation unit 30 with the data (the distance data) related to the distance and the data (the pixel position data) related to the pixel position of the object in each of the right images PR.

Thereafter, the determination part 31 included in the correction amount calculation unit 30 may determine whether the pixel positions of the object in the respective right images PR are close to each other on the basis of the pixel position data supplied by the SLAM processing unit 24 (step S102). For example, in the example illustrated in FIG. 3, the pixel position data may include the position xr1 at timing t1 and the position xr2 at timing t2. The determination part 31 may determine whether the pixel positions of the object are close to each other by determining whether the difference between the position xr1 at timing t1 and the position xr2 at timing t2 is within a predetermined amount. If the pixel positions are not close to each other ("N" in step S103), the flow may end.

In step S103, if the pixel positions are close to each other ("Y" in step S103), the parallax value storage 32 may convert the distance to the object indicated by the distance data supplied by the SLAM processing unit 24 into the parallax DISP1, and may store the parallax DISP1 in association with the pixel position indicated by the pixel position data supplied by the SLAM processing unit 24 (step S104). For example, the parallax value storage 32 may store the parallax DISP1 in association with the image region R (illustrated in FIG. 4) to which the pixel position indicated by the pixel position data belongs.

Further, the parallax value storage 32 may store the parallax DISP2 related to the object obtained by the corresponding-point detection part 23 on the basis of the stereo image PIC in association with the pixel position of the corresponding point (step S105). For example, the parallax value storage 32 may store the parallax DISP2 in association with the image region R (illustrated in FIG. 4) to which the pixel position of the corresponding point belongs.

Thereafter, the parameter calculation part 33 may calculate the parameters α and β on the basis of one or more parallaxes DISP1 and one or more parallaxes DISP2 associated with the image region R in which the parallaxes DISP1 and DISP2 are stored in steps S104 and S105 (step S106). In one example, the parameter calculation part 33 may calculate, by using the following equation, the parameters α and β in such a manner that the value err becomes the minimum in the relevant image region R.

$$err = \Sigma(DISP1 - DISP2 \times \alpha + \beta)$$

Thereafter, the correction coefficient calculation part 34 may calculate the correction coefficients A and B on the basis of the parameters α and β for the image region R in which the parallaxes DISP1 and DISP2 are stored in steps S104 and S105, and the correction map storage 35 may update the correction amount in the relevant image region R in the correction map data MAP on the basis of the correction coefficients A and B (step S107). For example, the correction coefficient calculation part 34 may increase the correction coefficient A if the parameter α is greater than 1, and may decrease the correction coefficient A if the parameter α is less than 1. Further, the correction coefficient calculation part 34 may increase the correction coefficient B if the parameter β is greater than 0, and may decrease the correction coefficient B if the parameter β is less than 0. The correction map storage 35 may, for example, set the correction coefficient B in each of the image regions R as the correction amount in the relevant image region R. The correction map storage 35 may, for example, further use the correction coefficient A to calculate the correction amount in the relevant image region R.

The correction map storage 35 may check whether the correction map data MAP converges (step S108). If the correction map data MAP does not converge ("N" in step S108), the flow may end.

In step S108, if the correction map data MAP converges ("Y" in step S108), the correction map storage 35 may supply the image correction unit 21 with the correction map data MAP (step S109). The image correction unit 21 may thereafter perform the image correction process on the basis of such correction map data MAP.

This may be the end of this flow.

In this way, the image processing apparatus 1 includes the SLAM processing unit 24, the corresponding-point detection part 23, the correction amount calculation unit 30, and the image correction unit 21. The SLAM processing unit 24 calculates a first distance on the basis of the right images PR generated by the right camera 11R. The first distance is a distance to an imaging target. The right images PR are included in stereo images PIC that are generated by the stereo camera 11 sequentially performing image capturing operations. The stereo camera 11 includes the right camera 11R and the left camera 11L. The corresponding-point detection part 23 calculates a second distance on the basis of at least one of the stereo images PIC. The second distance is a distance to the imaging target. The correction amount calculation unit 30 determines whether a difference between pixel positions, each corresponding to the imaging target, in the respective right images PR is within a predetermined amount, and, in a case where the difference between the pixel positions is within the predetermined amount, calculates, on the basis of the first distance and the second distance, a correction amount of a pixel position corresponding to the imaging target in the left image PL generated by the left camera 11L. The image correction unit 21 causes a position of a pixel value included in the left image PL generated by the left camera 11L to move in the lateral direction on the basis of the correction amount. Thus, even in a case where the image distortion due to the windshield 9 occurs, the image processing apparatus 1 is able to enhance the accuracy of the parallax image PD.

In other words, the glass portion of the windshield 9 in front of the imaging plane of the left camera 11L and the glass portion of the windshield 9 in front of the imaging plane of the right camera 11R may each desirably have a uniform optical characteristic, but can each have a non-uniform optical characteristic in practice. In this case, for example, the left image PL and the right image PR can each be distorted. For example, in a case where the left image PL is different from the right image PR in image distortion in a lateral direction, the difference in image distortion may influence the parallax obtained by the stereo matching process, and this may decrease the accuracy of the parallax image PD.

In the image processing apparatus 1: the SLAM processing unit 24 calculates, on the basis of the right images PR, the first distance which is the distance to the imaging target; in the case where the difference between the pixel positions, each corresponding to the imaging target, in the respective right images PR is within a predetermined amount, the correction amount calculation unit 30 calculates, on the basis of the first distance and the second distance which is obtained on the basis of the stereo image PIC, the correction amount of the pixel position corresponding to the imaging target in the left image PL generated by the left camera 11L; and the image correction unit 21 causes a position of a pixel value included in the image generated by the left camera 11L to move in the lateral direction on the basis of the correction amount. Thus, even in a case where nonuniform image distortion occurs due to the windshield 9, the image processing apparatus 1 is able to generate a correction amount corresponding to coordinates, and is therefore able to enhance the accuracy of the parallax image PD.

Other methods of enhancing the accuracy of the parallax image PD may include, for example, a method involving: providing a radar device configured to perform a detection of a distance to a surrounding object and a direction of the object; and calibrating the parallax image PD on the basis of a result of the detection performed by the radar device. However, this is expensive and complicates a system. The image processing apparatus 1, in contrast, is able to reduce the influence of the image distortion caused by the windshield 9 without providing a new device, and is thus able to enhance the accuracy of the parallax image PD in a simple method while reducing costs.

As described above, in the example embodiment, the SLAM processing unit, the corresponding-point detection part, the correction amount calculation unit, and the image correction unit are provided. The SLAM processing unit calculates the first distance on the basis of the right images generated by the right camera. The first distance is a distance to an imaging target. The right images are included in the stereo images that are generated by the stereo camera sequentially performing image capturing operations. The stereo camera includes the right camera and the left camera. The corresponding-point detection part calculates the second distance on the basis of at least one of the stereo images. The second distance is a distance to the imaging target. The correction amount calculation unit determines whether a difference between pixel positions, each corresponding to the imaging target, in the respective right images is within a predetermined amount, and, in a case where the difference between the pixel positions is within the predetermined amount, calculates, on the basis of the first distance and the second distance, a correction amount of a pixel position corresponding to the imaging target in the left image generated by the left camera. The image correction unit causes a position of a pixel value included in the left image generated by the left camera to move in the lateral direction on the basis of the correction amount. Therefore, even in the case where the image distortion due to the windshield occurs, it is possible to enhance the accuracy of the parallax image.

An example embodiment has been described above in which the control unit 25 controls the operation to be performed by the SLAM processing unit 24 and the correction amount calculation unit 30. For example, the control unit 25 may control the operation to be performed by the SLAM processing unit 24 and the correction amount calculation unit 30 on the basis of, for example, a traveling speed and a yaw rate of the vehicle 10. An image processing apparatus 1A according to Modification 1 will be described below.

Figure 6:
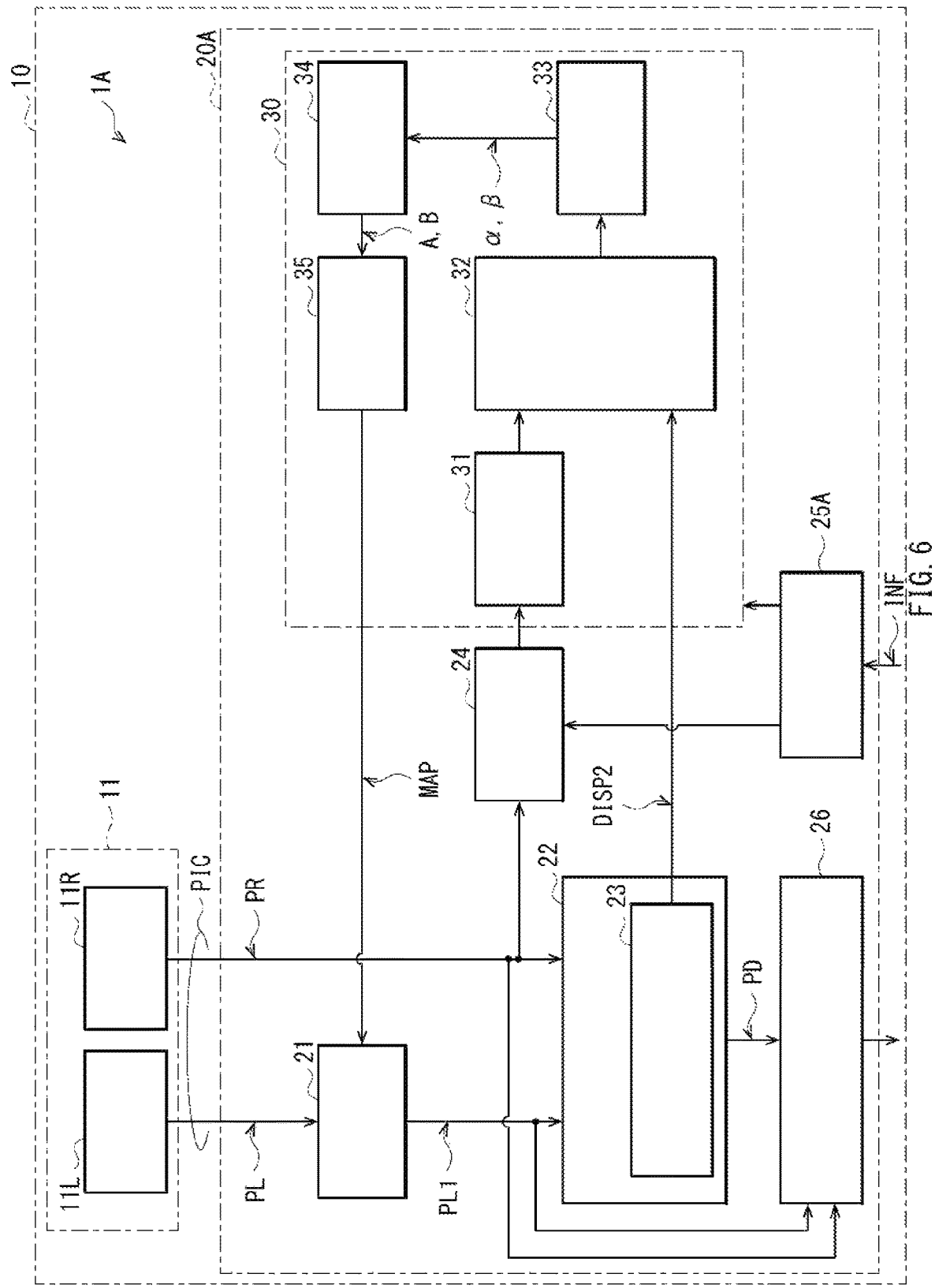
FIG. 6 is a block diagram illustrating a configuration example of an image processing apparatus according to one modification example.

FIG. 6 illustrates a configuration example of the image processing apparatus 1A. The image processing apparatus 1A may include a processor 20A. The processor 20A may include a control unit 25A. The control unit 25A may be configured to control an operation to be performed by the SLAM processing unit 24 and the correction amount calculation unit 30 on the basis of traveling data INF of the vehicle 10 supplied by an unillustrated ECU included in the vehicle 10. The traveling data INF may include, for example, information related to the traveling speed of the vehicle 10 and information related to the yaw rate of the vehicle 10.

Figure 7:
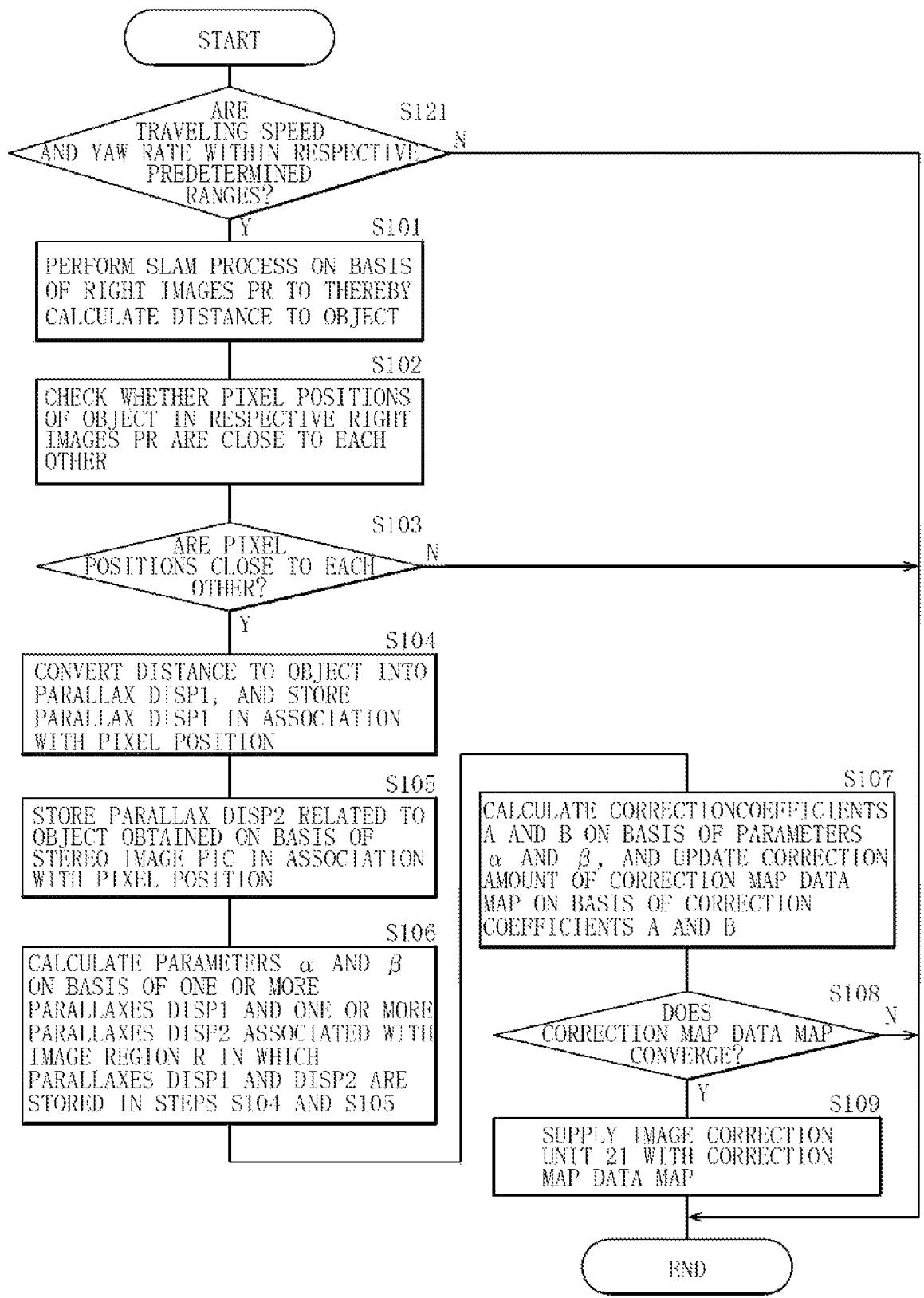
FIG. 7 is a flowchart illustrating an operation example of a processor illustrated in FIG. 6.

FIG. 7 illustrates an operation example to be performed by the SLAM processing unit 24 and the correction amount calculation unit 30 according to Modification 1. First, the control unit 25A may check, on the basis of the traveling data INF of the vehicle 10 supplied by the ECU, whether a value of the traveling speed of the vehicle 10 is within a predetermined range and whether a value of the yaw rate of the vehicle 10 is within a predetermined range (step S121). If the value of the traveling speed of the vehicle 10 is within the predetermined range and the value of the yaw rate of the vehicle 10 is within the predetermined range ("Y" in step S121), the process may proceed to step S101. If such conditions are not satisfied ("N" in step S121), the flow may end.

In other words, for example, in a case where the vehicle 10 is close to the stop or the traveling speed of the vehicle 10 is extremely high, it is difficult for the SLAM processing unit 24 to perform the SLAM process with high accuracy. Also, for example, in a case where the yaw rate of the vehicle 10 is high, it is difficult for the SLAM processing unit 24 to perform the SLAM process with high accuracy. Thus, the control unit 25A may control the SLAM processing unit 24 and the correction amount calculation unit 30 to perform the processes from steps S101 to S109 in a case where, for example, the respective values of the traveling speed and the yaw rate of the vehicle 10 are such that the SLAM processing unit 24 is able to perform the SLAM process with high accuracy, and to not perform the process otherwise.

The processes of step S102 and steps subsequent thereto are similar to those in an example embodiment described above (FIG. 5).

As a result, in the image processing apparatus 1A, the SLAM processing unit 24 may be able to perform the SLAM process with high accuracy. This helps to enhance the accuracy of the parallax image PD.

An example embodiment has been described above in which the SLAM processing unit 24 performs the SLAM process on the basis of the right images PR to thereby calculate the distance to the object that remains still which is included in each of the right images PR. In this case, the SLAM processing unit may estimate a pixel position of the object in each of the right images PR on the basis of, for example, a traveling speed and a yaw rate of the vehicle 10. An image processing apparatus 1B according to Modification 2 will be described below.

Figure 8:
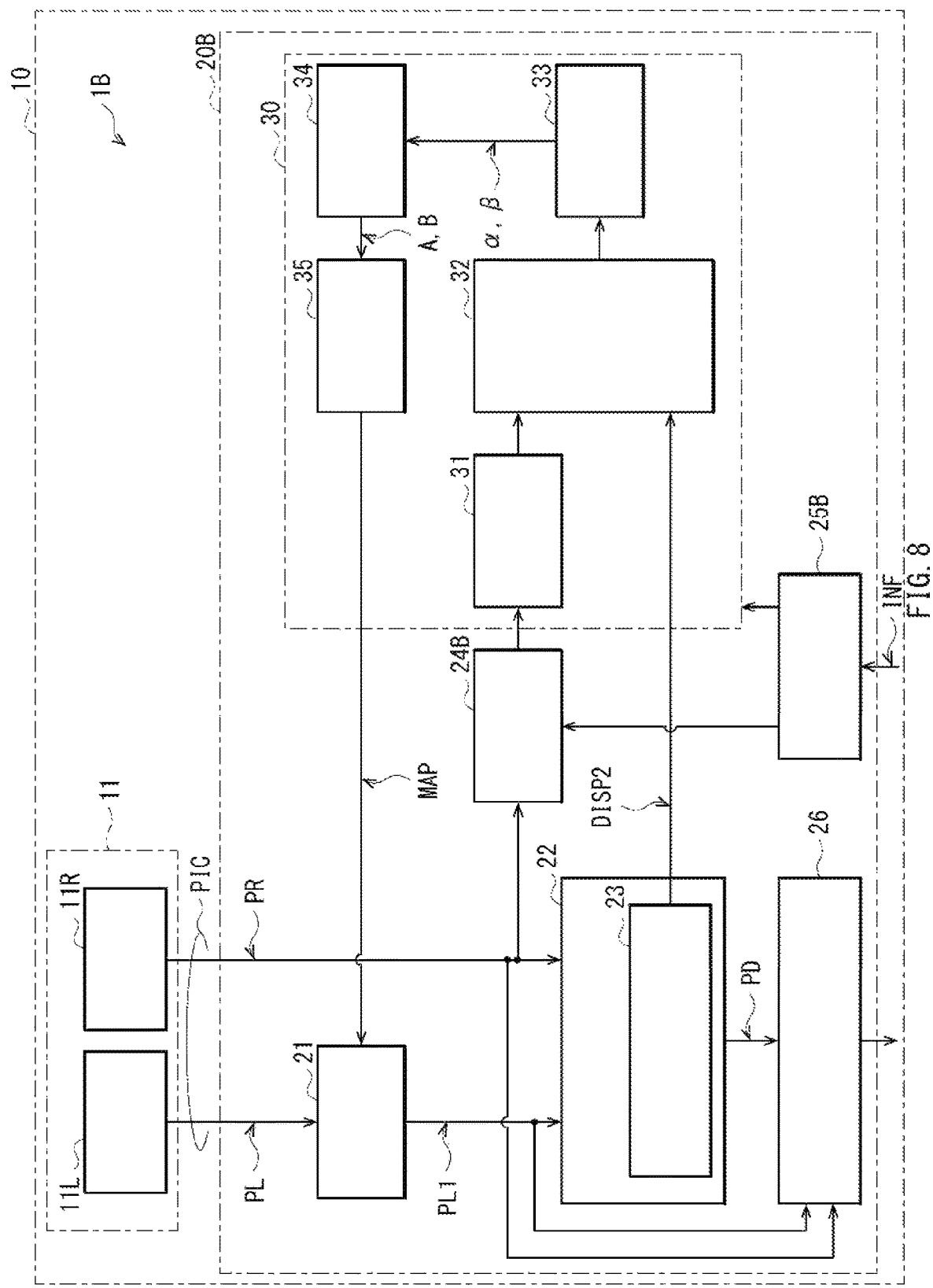
FIG. 8 is a block diagram illustrating a configuration example of an image processing apparatus according to one modification example.

FIG. 8 illustrates a configuration example of the image processing apparatus 1B. The image processing apparatus 1B may include a processor 20B. The processor 20B may include a control unit 25B and a SLAM processing unit 24B.

The control unit 25B may be configured to control an operation to be performed by the SLAM processing unit 24B and the correction amount calculation unit 30. The control unit 25B may be supplied with traveling data INF of the vehicle 10 by an unillustrated ECU included in the vehicle 10. The traveling data INF may include, for example, information related to the traveling speed of the vehicle 10 and information related to the yaw rate of the vehicle 10. The control unit 25B may be configured to supply the SLAM processing unit 24B with the information related to the traveling speed and the information related to the yaw rate.

As with the SLAM processing unit 24 according to an example embodiment described above, the SLAM processing unit 24B may perform the SLAM process on the basis of the right images PR to thereby calculate the distance to the object that remains still which is included in each of the right images PR. Further, the SLAM processing unit 24B may also serve to estimate a pixel position of the object in the right image PR on the basis of the traveling speed and the yaw rate of the vehicle 10. In one example, the SLAM processing unit 24B may estimate a pixel position of the object in the next right image PR on the basis of, for example: a pixel position of the object in the right image PR that has been obtained in the past; and the traveling speed and the yaw rate of the vehicle 10. Thereafter, the SLAM processing unit 24B may determine whether the pixel position of the object obtained by the SLAM process is close to the estimated pixel position.

Figure 9:
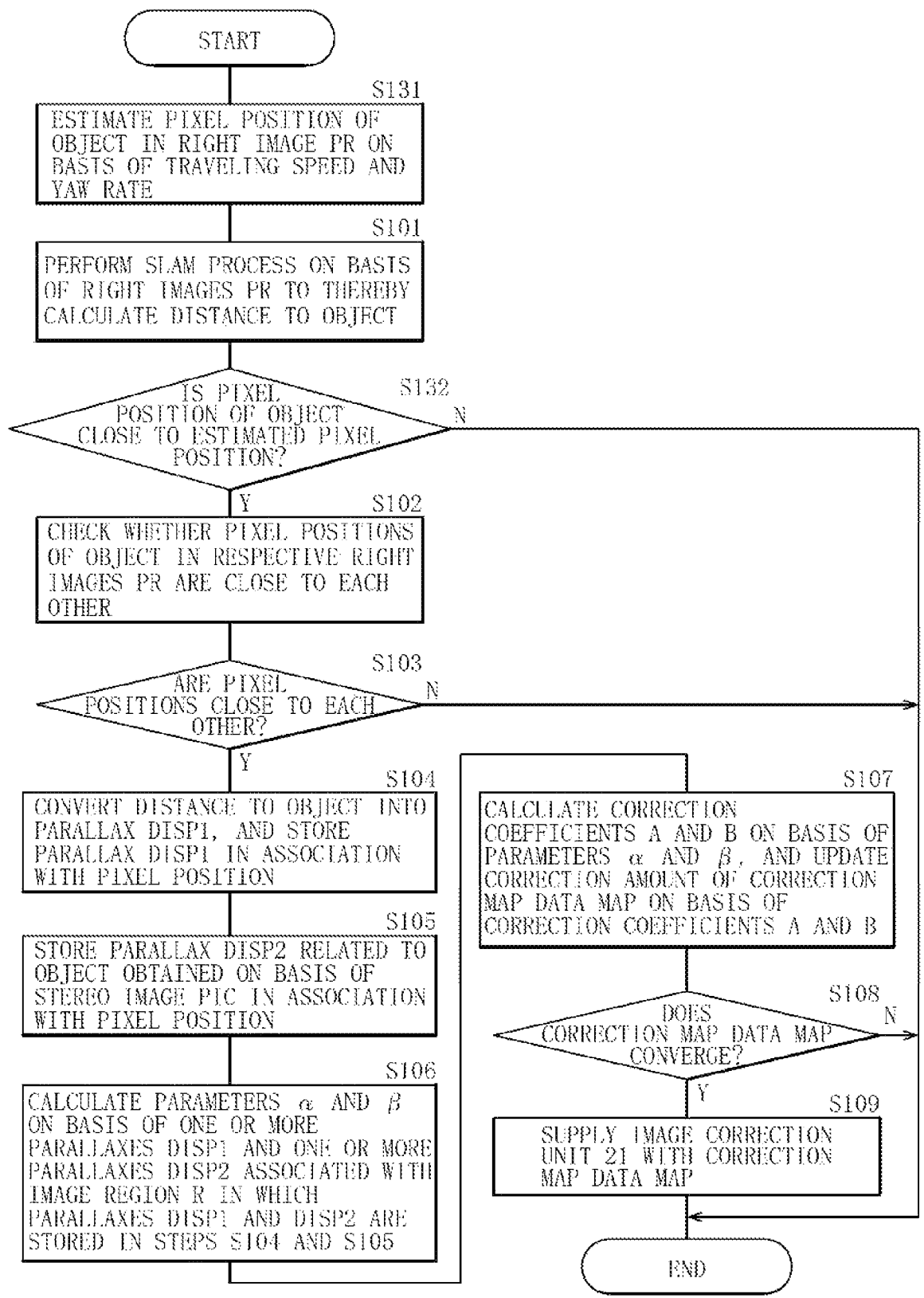
FIG. 9 is a flowchart illustrating an operation example of a processor illustrated in FIG. 8.

FIG. 9 illustrates an operation example to be performed by the SLAM processing unit 24B and the correction amount calculation unit 30 according to Modification 2.

First, the SLAM processing unit 24B may estimate the pixel position of the object in each of the right images PR on the basis of the traveling speed and the yaw rate of the vehicle 10 (step S131).

Thereafter, the SLAM processing unit 24B may perform the SLAM process on the basis of the right images PR to thereby calculate the distance to the object that remains still which is included in each of the right images PR, as in an example embodiment described above (step S101). In the SLAM process, the SLAM processing unit 24B may calculate the pixel position of the object in the right image PR.

Thereafter, the SLAM processing unit 24B may check whether the pixel position of the object in the right image PR obtained in step S101 is close to the pixel position of the object estimated in step S131 (step S132). In one example, the SLAM processing unit 24B may determine whether a distance between the pixel position of the object in the right image PR obtained in step S101 and the pixel position of the object estimated in step S131 is within a predetermined amount to thereby determine whether the pixel position of the object obtained in step S101 is close to the pixel position of the object estimated in step S131. If a condition that the pixel position of the object obtained in step S101 is close to the pixel position of the object estimated in step S131 is satisfied, the process may proceed to step S102. If such a condition is not satisfied, the flow may end. In other words, if the condition is not satisfied, the pixel position of the object in step S101 can be an erroneous detection, and the SLAM processing unit 24B may thus discard a result of the process of step S101.

The processes of step S102 and steps subsequent thereto are similar to those in an example embodiment described above (FIG. 5).

As a result, the image processing apparatus 1B may calculate the correction amount without using the result of the process of step S101 in a case where the pixel position of the object is erroneously detected. This helps to enhance the accuracy of the parallax image PD.

An example embodiment has been described above in which the correction amount calculation unit 30 supplies the image correction unit 21 with the correction map data MAP; however, the disclosure is not limited thereto. Alternatively, for example, the correction amount calculation unit 30 may supply the image correction unit 21 with a function of a correction amount. An image processing apparatus 1C according to Modification 3 will be described below.

Figure 10:
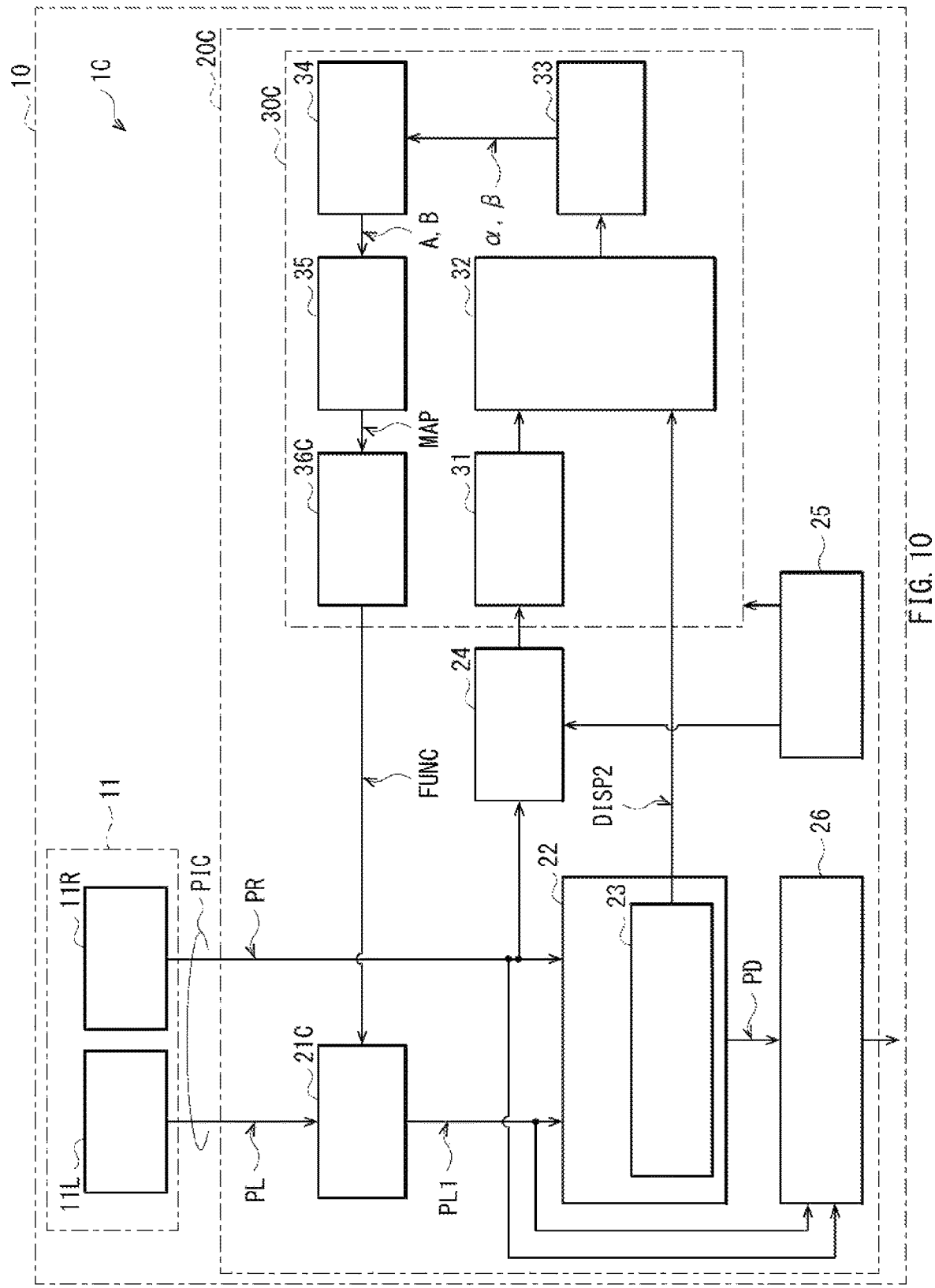
FIG. 10 is a block diagram illustrating a configuration example of an image processing apparatus according to one modification example.

FIG. 10 illustrates a configuration example of the image processing apparatus 1C. The image processing apparatus 1C may include a processor 20C. The processor 20C may include an image correction unit 21C and a correction amount calculation unit 30C.

The image correction unit 21C may be configured to perform an image correction process on the left image PL using a correction function FUNC to thereby generate the left image PL1. In the correction function FUNC, an input may be a coordinate value of a pixel position in the left image PL and an output may be the correction amount. The image correction unit 21C may calculate, for example, the respective correction amounts of all of the pixel positions in the left image PL on the basis of the correction function FUNC. The image correction unit 21C may generate the left image PL1 by moving a position of the pixel value in the left image PL in the lateral direction by the calculated correction amount.

The correction amount calculation unit 30C may include a correction function generation part 36C. The correction function generation part 36C may be configured to generate the correction function FUNC on the basis of the correction map data MAP supplied by the correction map storage 35.

Figure 11:
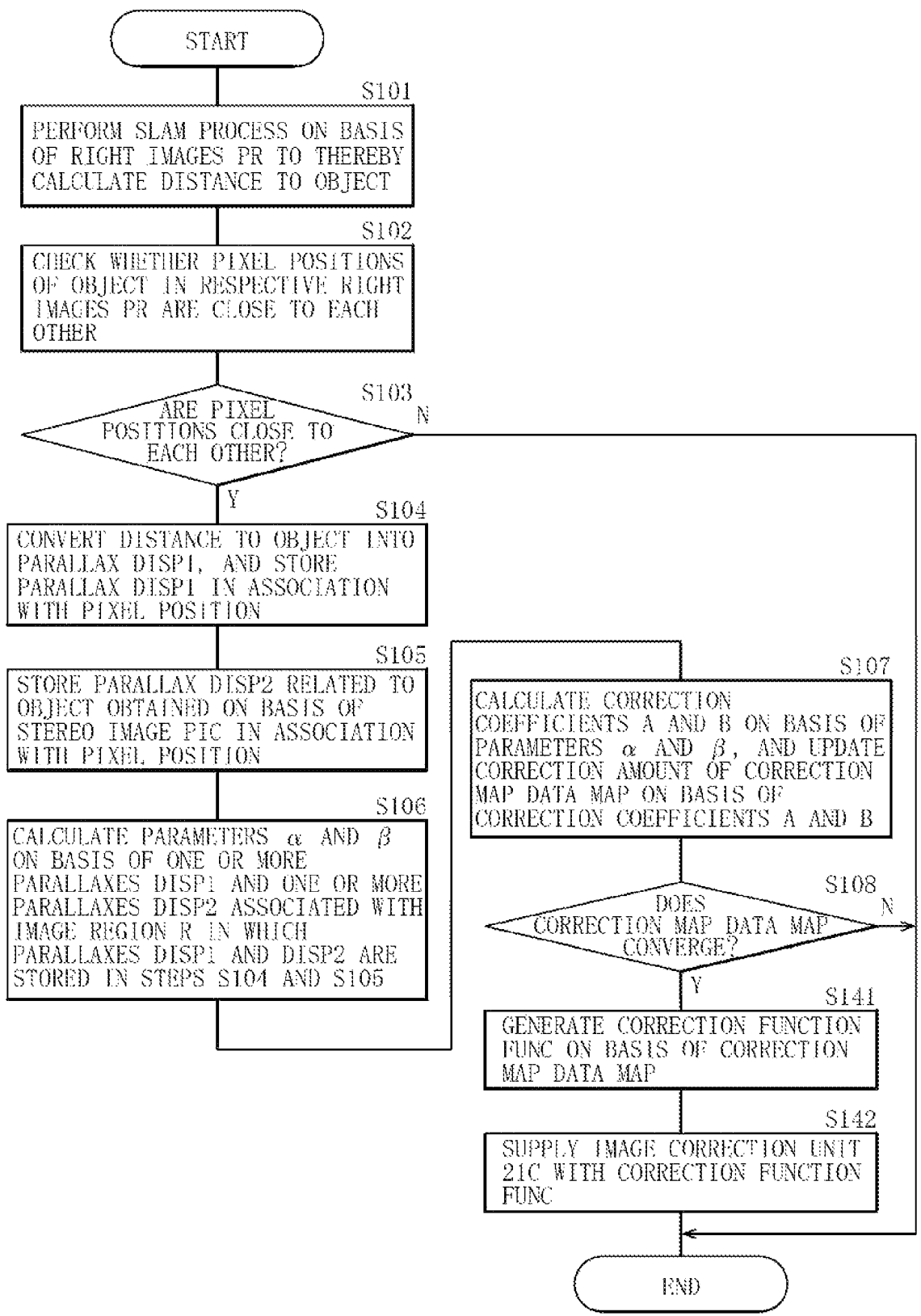
FIG. 11 is a flowchart illustrating an operation example of a processor illustrated in FIG. 10.

FIG. 11 illustrates an operation example to be performed by the SLAM processing unit 24 and the correction amount calculation unit 30C according to Modification 3. The processes from steps S101 to S108 are similar to those of an example embodiment described above (FIG. 5).

In step S108, if the correction map data MAP converges ("Y" in step S108), the correction function generation part 36C may generate the correction function FUNC on the basis of the correction map data MAP supplied by the correction map storage 35 (step S141).

The correction function generation part 36C may supply the image correction unit 21C with the correction function FUNC (step S142). Accordingly, the image correction unit 21C may perform the image correction process on the basis of the correction function FUNC thereafter.

This may be the end of this flow.

As a result, the image processing apparatus 1C may be able to calculate the correction amount using the correction function FUNC. This helps to enhance accuracy of the correction amount. In other words, the correction map data MAP may include, for example, 10 correction amounts in 10 image regions R, and this can cause the correction amount to change markedly near a border of the image regions R and the correction amounts to be discontinuous, for example. The correction function FUNC may be used in Modification 3, which makes it possible to increase the continuity of the correction amounts. The image processing apparatus 1C is therefore able to enhance quality of the left image PL1 generated by the image correction process and the accuracy of the parallax image PD.

An example embodiment has been described above in which the parallax DISP2 is calculated on the basis of the right image PR and the left image PL1 which is generated by the image correction unit 21; however, the disclosure is not limited thereto. The parallax DISP2 may be calculated on the basis of the right image PR and the left image PL. An image processing apparatus 1D according to Modification 4 will be described below.

Figure 12:
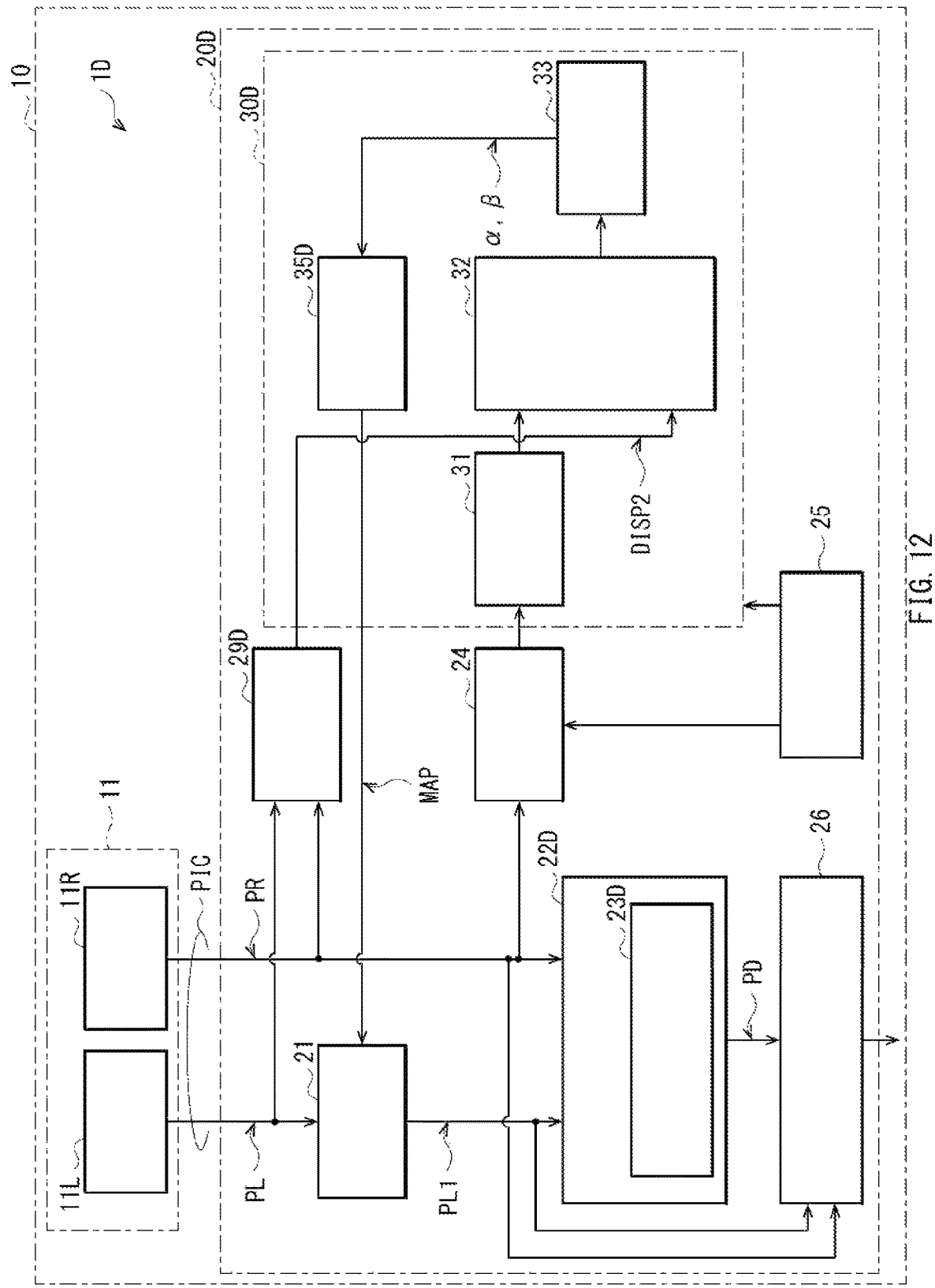
FIG. 12 is a block diagram illustrating a configuration example of an image processing apparatus according to one modification example.

FIG. 12 illustrates a configuration example of the image processing apparatus 1D. The image processing apparatus 1D may include a processor 20D. The processor 20D may include a corresponding-point detection part 29D, a parallax image generation unit 22D, and a correction amount calculation unit 30D.

The corresponding-point detection part 29D may be configured to perform the stereo matching process on the basis of the left image PL and the right image PR to thereby detect a corresponding point. The corresponding point may include an image point in the left image PL and an image point in the right image PR which correspond to each other. The corresponding-point detection part 29D may calculate, as the parallax DISP2 of the corresponding point, a difference between a position in the lateral direction of the image point in the left image PL and a position in the lateral direction of the image point in the right image PR. The corresponding-point detection part 29D may supply the correction amount calculation unit 30 with the respective parallaxes DISP2 of the detected corresponding points together with data (pixel position data) related to pixel positions of the corresponding points.

As with the parallax image generation unit 22 according to an example embodiment described above, the parallax image generation unit 22D may be configured to perform a predetermined image process including the stereo matching process on the basis of the left image PL1 and the right image PR to thereby generate the parallax image PD. The parallax image generation unit 22D may include a corresponding-point detection part 23D. The corresponding-point detection part 23D may be configured to perform the stereo matching process on the basis of the left image PL1 and the right image PR to thereby detect a corresponding point. The corresponding point may include an image point in the left image PL1 and an image point in the right image PR which correspond to each other.

The correction amount calculation unit 30D may include the determination part 31, the parallax value storage 32, the parameter calculation part 33, and a correction map storage 35D. The correction map storage 35D may be configured to update, in each of the image regions R, a correction amount in a relevant image region R in the correction map data MAP on the basis of the parameters α and β. The correction map storage 35D may, for example, set the parameter β in each of the image regions R as the correction amount in the relevant image region R. The correction map storage 35D may, for example, further use the parameter α to calculate the correction amount in the relevant image region R.

Figure 13:
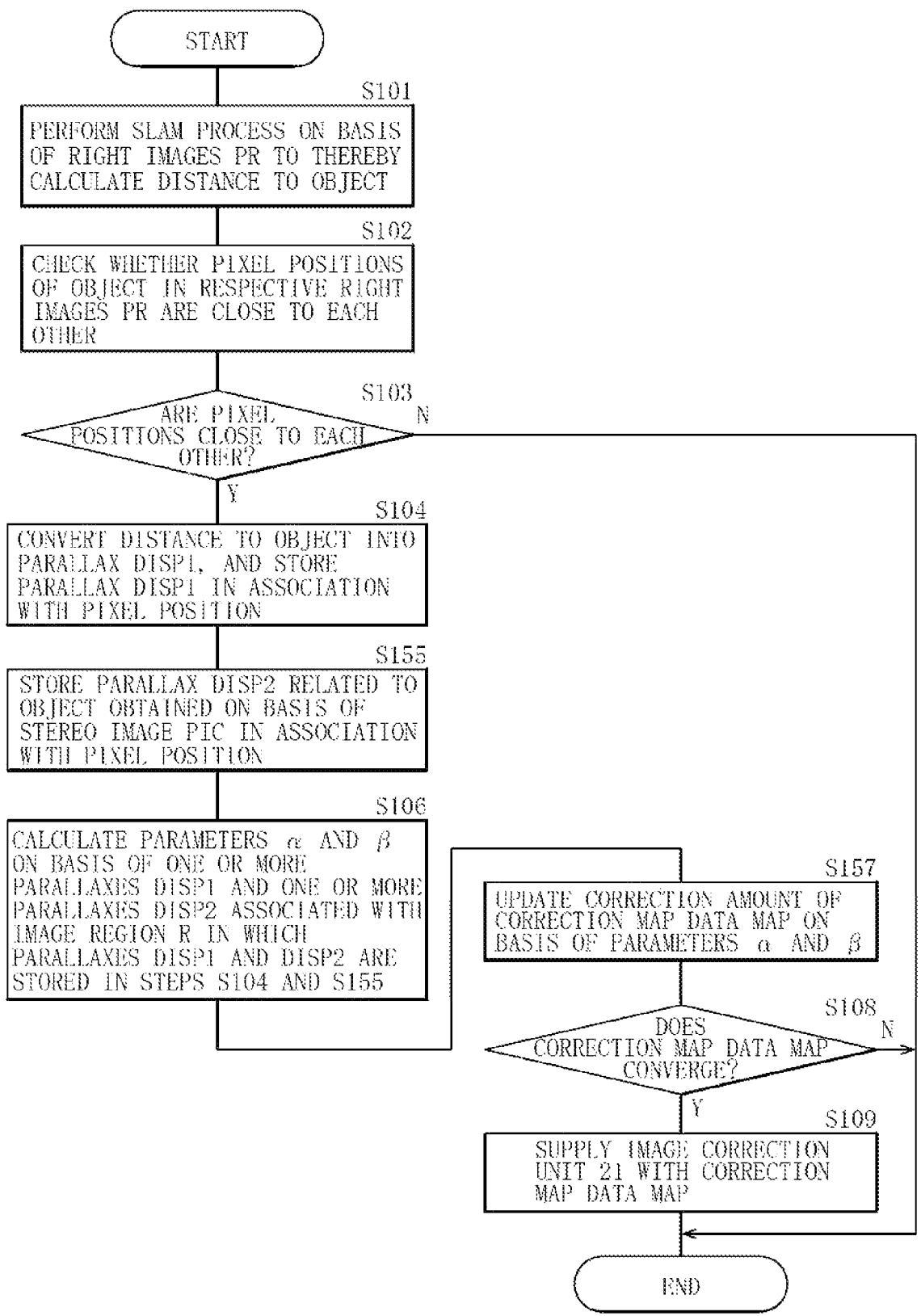
FIG. 13 is a flowchart illustrating an operation example of a processor illustrated in FIG. 12.

FIG. 13 illustrates an operation example to be performed by the SLAM processing unit 24 and the correction amount calculation unit 30D according to Modification 4. The processes from steps S101 to S104, S106, S108, and S109 are similar to those in an example embodiment described above (FIG. 5).

In step S104, the parallax value storage 32 may convert the distance to the object indicated by the distance data supplied by the SLAM processing unit 24 into the parallax DISP1, and may store the parallax DISP1 in association with the pixel position indicated by the pixel position data.

The parallax value storage 32 may store the parallax DISP2 related to the object obtained by the corresponding-point detection part 29D on the basis of the stereo image PIC in association with the pixel position of the corresponding point (step S155).

Thereafter, in step S106, the parameter calculation part 33 may calculate the parameters α and β on the basis of one or more parallaxes DISP1 and one or more parallaxes DISP2 associated with the image region R in which the parallaxes DISP1 and DISP2 are stored in steps S104 and S155.

Thereafter, the correction map storage 35D may update the correction amount in the relevant image region R in the correction map data MAP on the basis of the parameters α and β (step S157). The correction map storage 35D may, for example, set the parameter β in each of the image regions R as the correction amount in the relevant image region R. The correction map storage 35D may, for example, further use the parameter α to calculate the correction amount in the relevant image region R.

An example embodiment has been described above in which the SLAM processing unit 24 performs the SLAM process on the basis of the right image PR, and the image correction unit 21 performs the image correction process on the left image PL to thereby generate the left image PL1; however, the disclosure is not limited thereto. Alternatively, for example, the SLAM processing unit 24 may perform the SLAM process on the basis of the left image PL, and the image correction unit 21 may perform the image correction process on the right image PR to thereby generate a right image PR1.

Two or more of modifications described above may be combined.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, an example embodiment has been described above in which the stereo camera 11 captures an image ahead of the vehicle 10; however, the disclosure is not limited thereto. For example, the stereo camera 11 may capture an image in a lateral direction of the vehicle 10 and an image behind the vehicle 10.

The example effects described above are merely illustrative and non-limiting. Any embodiment may achieve an effect other than the example effects described above.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. An image processing apparatus comprising:
one or more processors; and
one or more memories storing instructions causing the one or more processors to:
calculate a first distance on a basis of first images generated by a first camera, the first distance being a distance to an imaging target, the first images being comprised in stereo images that are generated by a stereo camera sequentially performing image capturing operations, the stereo camera comprising the first camera and a second camera;
calculate a second distance on a basis of at least one of the stereo images, the second distance being a distance to the imaging target;

determine whether a difference between pixel positions, each corresponding to the imaging target, in the respective first images is within a predetermined amount, and, in a case where the difference between the pixel positions is within the predetermined amount, calculate, on a basis of the first distance and the second distance, a correction amount of a pixel position corresponding to the imaging target in an image generated by the second camera; and cause a position of a pixel value comprised in an image generated by the second camera to move in a lateral direction on a basis of the correction amount.

2. The image processing apparatus according to claim 1, wherein each of the stereo images comprises an image generated by the first camera and an image generated by the second camera.

3. The image processing apparatus according to claim 1, the one or more processors are further configured to control an execution of (i) the calculation of the first distance; (ii) the calculation of the second distance; and (iii) the determination of whether the difference between pixel positions is within the predetermined amount, on a basis of (i) whether a value of a traveling speed of a mobile object to which the image processing apparatus is provided is within a predetermined range, and (ii) whether a value of a yaw rate of the mobile object to which the image processing apparatus is provided is within a predetermined range.

4. The image processing apparatus according to claim 2, the one or more processors are further configured to control an execution of (i) the calculation of the first distance; (ii) the calculation of the second distance; and (iii) the determination of whether the difference between pixel positions is within the predetermined amount, on a basis of (i) whether a value of a traveling speed of a mobile object to which the image processing apparatus is provided is within a predetermined range, and (ii) whether a value of a yaw rate of the mobile object to which the image processing apparatus is provided is within a predetermined range.

5. The image processing apparatus according to claim 1, wherein the one or more processors are further configured to:

estimate, on a basis of a traveling speed and a yaw rate of a mobile object to which the image processing apparatus is provided, a pixel position corresponding to the imaging target in an image generated by the first camera, and perform a process in a case where an estimated difference between each of the pixel positions, each corresponding to the imaging target, in the respective first images and the pixel position is within a predetermined amount.

6. The image processing apparatus according to claim 2, wherein the one or more processors are further configured to:

estimate, on a basis of a traveling speed and a yaw rate of a mobile object to which the image processing apparatus is provided, a pixel position corresponding to the imaging target in the image generated by the first camera, and perform a process in a case where an estimated difference between each of the pixel positions, each corresponding to the imaging target, in the respective first images and the pixel position is within a predetermined amount.

7. The image processing apparatus according to claim 3, wherein the one or more processors are further configured to:

estimate, on a basis of the traveling speed and the yaw rate of the mobile object, a pixel position corresponding to the imaging target in the image generated by the first camera, and perform a process in a case where an estimated difference between each of the pixel positions, each corresponding to the imaging target, in the respective first images and the pixel position is within a predetermined amount.

8. An image processing method comprising:

calculating a first distance on a basis of first images generated by a first camera, the first distance being a distance to an imaging target, the first images being comprised in stereo images that are generated by a stereo camera sequentially performing image capturing operations, the stereo camera comprising the first camera and a second camera;

calculating a second distance on a basis of at least one of the stereo images, the second distance being a distance to the imaging target;

determining whether a difference between pixel positions, each corresponding to the imaging target, in the respective first images is within a predetermined amount, and, in a case where the difference between the pixel positions is within the predetermined amount, calculating, on a basis of the first distance and the second distance, a correction amount of a pixel position corresponding to the imaging target in an image generated by the second camera; and causing a position of a pixel value comprised in the image generated by the second camera to move in a lateral direction on a basis of the correction amount.

9. An image processing apparatus, the image processing apparatus comprising a circuitry configured to calculate a first distance on a basis of first images generated by a first camera, the first distance being a distance to an imaging target, the first images being comprised in stereo images that are generated by a stereo camera sequentially performing image capturing operations, the stereo camera comprising the first camera and a second camera, calculate a second distance on a basis of at least one of the stereo images, the second distance being a distance to the imaging target, determine whether a difference between pixel positions, each corresponding to the imaging target, in the respective first images is within a predetermined amount, and, in a case where the difference between the pixel positions is within the predetermined amount, calculate, on a basis of the first distance and the second distance, a correction amount of a pixel position corresponding to the imaging target in an image generated by the second camera, and cause a position of a pixel value comprised in the image generated by the second camera to move in a lateral direction on a basis of the correction amount.

* * * * *